(12) United States Patent
Okuhira et al.

(10) Patent No.: US 9,827,945 B2
(45) Date of Patent: Nov. 28, 2017

(54) ANCHOR FOR SEATBELT DEVICE (71) Applicant: KABUSHIKI KAISHA TOKAI-RIKA-DENKI-SEISAKUSHO, Aichi-ken (JP)

(72) Inventors: Tomohiro Okuhira, Aichi-ken (JP); Tomotaka Suzuki, Aichi-ken (JP); Takahiro Hamada, Aichi-ken (JP); Tetsushi Urushibata, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/018,122

(22) Filed: Feb. 8, 2016

(65) Prior Publication Data
US 2016/0236646 A1 Aug. 18, 2016

(30) Foreign Application Priority Data

Feb. 12, 2015 (JP) ................................. 2015-025554

(51) Int. Cl.
*B60R 22/18* (2006.01)

(52) U.S. Cl.
CPC ...... *B60R 22/18* (2013.01); *B60R 2022/1818* (2013.01)

(58) Field of Classification Search
CPC ........................ B60R 22/18; B60R 2022/1818
See application file for complete search history.

(56) References Cited

U.S. PATENT DOCUMENTS

| | | | | |
|---|---|---|---|---|
| 5,513,880 A * | 5/1996 | Ohira | ...................... | B60R 22/24 280/808 |
| 5,762,373 A * | 6/1998 | Sugimoto | ............... | B60R 22/24 280/801.1 |
| 5,918,903 A * | 7/1999 | Ito | ........................... | B60R 22/24 280/801.1 |
| 6,267,410 B1 * | 7/2001 | Koketsu | .................. | B60R 22/24 280/801.1 |
| 6,491,347 B2 * | 12/2002 | Iseki | ....................... | B60R 22/24 280/801.1 |
| 7,192,057 B2 * | 3/2007 | Moendel | ................. | B60R 22/18 280/801.1 |
| 7,597,359 B2 * | 10/2009 | Gray | ...................... | B60R 22/24 280/808 |
| 7,878,546 B2 * | 2/2011 | Tabata | .................... | B60R 22/18 280/801.1 |

(Continued)

FOREIGN PATENT DOCUMENTS

| | | |
|---|---|---|
| JP | H09-290706 A | 11/1997 |
| JP | 2008-260415 A | 10/2008 |

(Continued)

OTHER PUBLICATIONS

Japanese Application No. 2015-025554, Office Action dated Oct. 3, 2017.

*Primary Examiner* — Laura Freedman
(74) *Attorney, Agent, or Firm* — Roberts Mlotkowski Safran Cole & Calderon P.C.

(57) ABSTRACT

In a through anchor, a thinned portion is formed at a metal core lower portion of a metal core. This thereby enables an increase in body size of the through anchor to be prevented or suppressed even when a mold portion is made thick at the portion of the metal core where the thinned portion is formed.

5 Claims, 4 Drawing Sheets

(56) References Cited

U.S. PATENT DOCUMENTS

| | | | | |
|---|---|---|---|---|
| 8,905,438 B2 * | 12/2014 | Ohmura | ............. | A44B 11/2561 |
| | | | | 24/588.11 |
| 9,150,191 B2 * | 10/2015 | Toyama | ................. | B60R 22/24 |
| 9,457,764 B2 * | 10/2016 | Wakabayashi | ........... | B60R 22/24 |
| 2013/0240662 A1 * | 9/2013 | Ito | ........................... | B60R 22/24 |
| | | | | 242/615.3 |
| 2014/0306436 A1 * | 10/2014 | Toyama | ................. | B60R 22/24 |
| | | | | 280/801.1 |
| 2016/0214566 A1 * | 7/2016 | Okuhira | ................. | B60R 22/18 |

FOREIGN PATENT DOCUMENTS

| | | | | |
|---|---|---|---|---|
| JP | 2014-205422 | | 10/2014 | |
| SE | DE 10210781 A1 * | | 10/2003 | ............. B60R 22/24 |

* cited by examiner

ANCHOR FOR SEATBELT DEVICE

CROSS-REFERENCE TO RELATED APPLICATION

This application claims priority under 35 USC 119 from Japanese Patent Application No. 2015-025554 filed Feb. 12, 2015, the disclosure of which is incorporated by reference herein.

BACKGROUND

Field of the Invention

The present invention relates to an anchor for a seatbelt device in which a metal core is covered by a mold portion.

Related Art

In an anchor for a seatbelt device in which a metal core is covered by a mold portion (see, for example, Japanese Patent Application Laid-Open (JP-A) No. 2014-205422), a body of the anchor for a seatbelt device is increased in size if thickness of the mold portion is increased in order to secure mechanical strength of the mold portion.

SUMMARY

In consideration of the above circumstances, an anchor for a seatbelt device capable of securing mechanical strength of a mold portion and also capable of suppressing increase in body size is obtained.

An anchor for a seatbelt device of a first aspect includes: a metal core at which a through hole is formed, a webbing for restraining an occupant being inserted through and supported at the through hole; and a mold portion that is formed from a synthetic resin material and that covers the metal core, wherein a portion of the metal core is thinner than another portion of the metal core.

In the anchor for a seatbelt device of the first aspect, a portion of the metal core is configured thinner than another portion of the metal core. This thereby enables the mold portion to be made thicker without increasing the body size of the anchor for a seatbelt device at the thinned portion of the metal core, and enables the mechanical strength of the mold portion to be secured.

A anchor for a seatbelt device of a second aspect is the anchor for a seatbelt device of the first aspect, wherein the portion of the metal core, which portion is at an outer side of the through hole in a vehicle front-rear direction, is thinner than the another portion of the metal core.

According to the anchor for a seatbelt device of the second aspect, the metal core is configured thinner at the vehicle front-rear direction outside portion of the through hole than at another portion (location). This thereby enables the thickness of the mold portion at the core metal to be secured at the vehicle front-rear direction outside portion of the through hole, and enables the mechanical strength of the mold portion to be secured, even if the through hole has a larger vehicle front-rear direction dimension.

A anchor for a seatbelt device of a third aspect is the anchor for a seatbelt device of either the first aspect or the second aspect, wherein, as seen from a penetrating direction of the through hole, the portion of the metal core, which portion is at a corner in an outer peripheral portion of the metal core, is thinner than the another portion of the metal core.

According to the anchor for a seatbelt device of the third aspect, the metal core is configured thinner at the outer peripheral corner portion than at another portion (location). This thereby enables the larger thickness of the mold portion to be secured (obtained) at the outer peripheral corner portion of the metal core and enables the mechanical strength of the mold portion to be secured, without increasing the thickness of the anchor for a seatbelt device at the outer peripheral corner portion of the metal core.

In the anchor for a seatbelt device of any one of the first aspect to the third aspect, an outside face of the mold portion may be configured as a curved face protruding out toward the outside at the thinned portion of the metal core.

In the anchor for a seatbelt device configured in this manner, the outside face of the mold portion is a curved face protruding out toward the outside at the thinned portion of the metal core. This thereby enables a concentration of stress in the mold portion at the thinned portion of the metal core to be alleviated.

In the anchor for a seatbelt device described above, an angle formed between an outside face on one side of the curved face and an outside face on another side of the curved face out in the outside face of the mold portion may be set larger than 90 degrees.

In the anchor for a seatbelt device configured in this manner, the angle formed between the outside face on the one side of the curved face and the outside face on the another side of the curved face in the outside face of the mold portion is set larger than 90°. This thereby enables a concentration of stress in the mold portion at the thinned portion of the metal core to be further alleviated.

As described above, the anchor for a seatbelt device according to the present aspects enable mechanical strength of the mold portion to be secured, and also enables an increase in body size to be suppressed.

BRIEF DESCRIPTION OF THE DRAWINGS

Exemplary embodiments will be described in detail with reference to the following figures, wherein.

DETAILED DESCRIPTION

Explanation follows regarding respective exemplary embodiments, with reference to FIG. 1 to FIG. 4. In the drawings, the arrow FR indicates the vehicle front side, the arrow OUT indicates the vehicle width direction outside, and the arrow UP indicates the vehicle upper side.

Configuration of First Exemplary Embodiment

Figure 1:
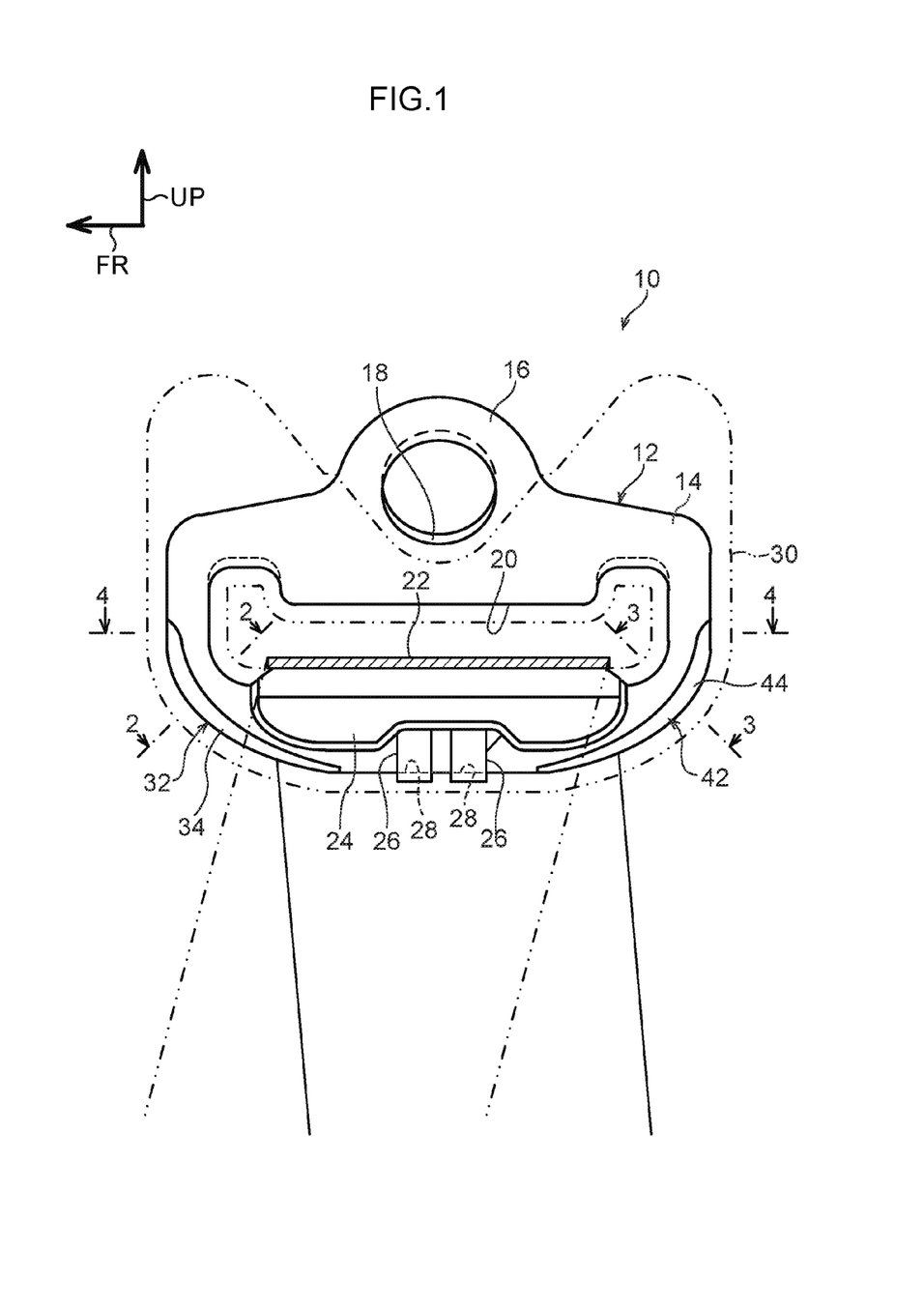
FIG. 1 is a face-on view of a anchor for a seatbelt device according to a first exemplary embodiment, as viewed from a vehicle width direction outside.

As illustrated in FIG. 1, a through anchor 10, serving as an anchor for a seatbelt device according to a first exemplary embodiment, includes a metal core 12. The metal core 12 is formed by pressing a metal plate member, such as a steel plate member. The metal core 12 includes a metal core lower portion 14. The length direction of the metal core lower portion 14 is along the vehicle front-rear direction, and thickness direction of a vehicle lower side portion of the metal core lower portion 14 is along the vehicle width direction. A metal core upper portion 16 is formed at a vehicle front-rear direction intermediate portion of a vehicle upper side end portion of the metal core lower portion 14. A vehicle front-rear direction dimension of the metal core upper portion 16 is shorter than the vehicle front-rear direction dimension of the metal core lower portion 14, and the metal core upper portion 16 extends out from the vehicle front-rear direction intermediate portion of the metal core lower portion 14. In the metal core 12, a part that is further toward the vehicle upper side than a vehicle up-down direction intermediate portion of the metal core lower portion 14 is inclined toward the vehicle width direction inside with respect to a part that is further toward the vehicle lower side than the vehicle up-down direction intermediate portion of the metal core lower portion 14.

A support hole 18 is formed in the metal core upper portion 16 and a vehicle upper side portion of the metal core lower portion 14 of the metal core 12. The support hole 18 has a substantially circular shaped cross-section, and the support hole 18 penetrates it in the thickness direction of the metal core upper portion 16. A support bolt (not illustrated in the drawings), serving as a support member, penetrates the support hole 18 from the vehicle width direction inside. The support bolt is attached by a nut to, for example, a slider of an anchor height adjustment device provided at a center pillar (none of which are illustrated in the drawings) on the vehicle width direction outside of the through anchor 10. The through anchor 10 is thus supported on the vehicle body so as to be capable of rotating (swinging) about the support bolt.

The metal core lower portion 14 of the metal core 12 is formed with a through hole 20. The through hole 20 penetrates the metal core lower portion 14 of the metal core 12 in the vehicle width direction, and a webbing 22 of the seatbelt device is disposed passing through the through hole 20. The longitudinal direction of the through hole 20 is along the vehicle front-rear direction, and both end portions in the vehicle front-rear direction of the through hole 20 are extended toward the vehicle upper side.

A piece (piece member) 24 is provided at the metal core lower portion 14 of the metal core 12. The piece 24 is formed from a synthetic resin material, and the longitudinal direction of the piece 24 is along the vehicle front-rear direction. A vehicle upper side face of the piece 24 configures a curved face that protrudes out toward the vehicle upper side, and a direction of an axial line of the center of curvature of the vehicle upper side face of the piece 24 is along the longitudinal direction of the metal core lower portion 14 of the metal core 12 (the vehicle front-rear direction). The vehicle upper side face of the piece 24 is abutted by the webbing 22 passing through the through hole 20. The piece 24 is formed with retention tabs 26.

The retention tabs 26 extend out toward the vehicle lower side from a vehicle front-rear direction intermediate portion of a vehicle lower side face of the piece 24. A vehicle lower side end portion of each retention tab 26 is formed with a retention claw 28. The retention claws 28 are formed projecting out from the vehicle lower side end portions of the retention tabs 26 toward the vehicle width direction inside. In an attached state of the piece 24 to the metal core 12, a vehicle width direction outside face of each retention tab 26 abuts a vehicle width direction inside face of the metal core lower portion 14 of the metal core 12, and a vehicle upper side face of each retention claw 28 abuts a vehicle lower side face of the metal core lower portion 14 of the metal core 12.

The through anchor 10 includes a mold portion 30. The mold portion 30 is formed by setting the metal core 12 in a mold used for mold-forming in a state in which the piece 24 is attached to the metal core 12, and filling the mold with a synthetic resin material for use in mold-forming in this state. Accordingly, at inside face of the through hole 20 in the metal core lower portion 14 of the metal core 12, a portion excluding the portion where the piece 24 is attached is covered by the mold portion 30. Moreover, the mold portion 30 is formed from a different synthetic resin material to the piece 24, with the piece 24 being configured from a synthetic resin material with lower sliding resistance against the webbing 22 than the synthetic resin material configuring the mold portion 30.

Note that as illustrated in FIG. 1, the metal core lower portion 14 of the metal core 12 is provided with thinned portions 32 and 42.

The thinned portions 32 and 42 are configured such that dimensions of the thinned portions 32 and 42 in a penetrating direction of the through hole 20 at the metal core 12 are smaller than dimensions at other locations of the metal core lower portion 14 (for example, at a center portion in the vehicle front-rear direction of a lower side portion in the vehicle upper-lower direction of the metal core lower portion 14, and/or at a portion of the metal core 12 in the vicinity of the through hole 20 formed position).

The thinned portion 32 is formed by pressing a vehicle front side end portion and a vehicle lower side end portion of the metal core lower portion 14, including an outer peripheral corner portion, which is at a vehicle front lower side, of the metal core lower portion 14 of the metal core 12. The forming position of the thinned portion 32 on the metal core 12 is to the vehicle front lower side (vehicle front-rear direction outside (front side) and vehicle lower side) of a vehicle front lower side end portion of the through hole 20 (vehicle front-rear direction front side end portion and vehicle lower side end portion of the through hole 20) of the metal core 12.

In other words, the forming position of the thinned portion 32 on the metal core 12 is a position which is at at least one side in the vehicle front-rear direction (front side) and at least one side in the vehicle upper-lower direction (lower side) of the metal core 12, on an outer peripheral portion of the metal core 12 (in the exemplary embodiment, the forming position of the thinned portion 32 includes the corner portion of the outer peripheral portion of the metal core 12).

Figure 2:
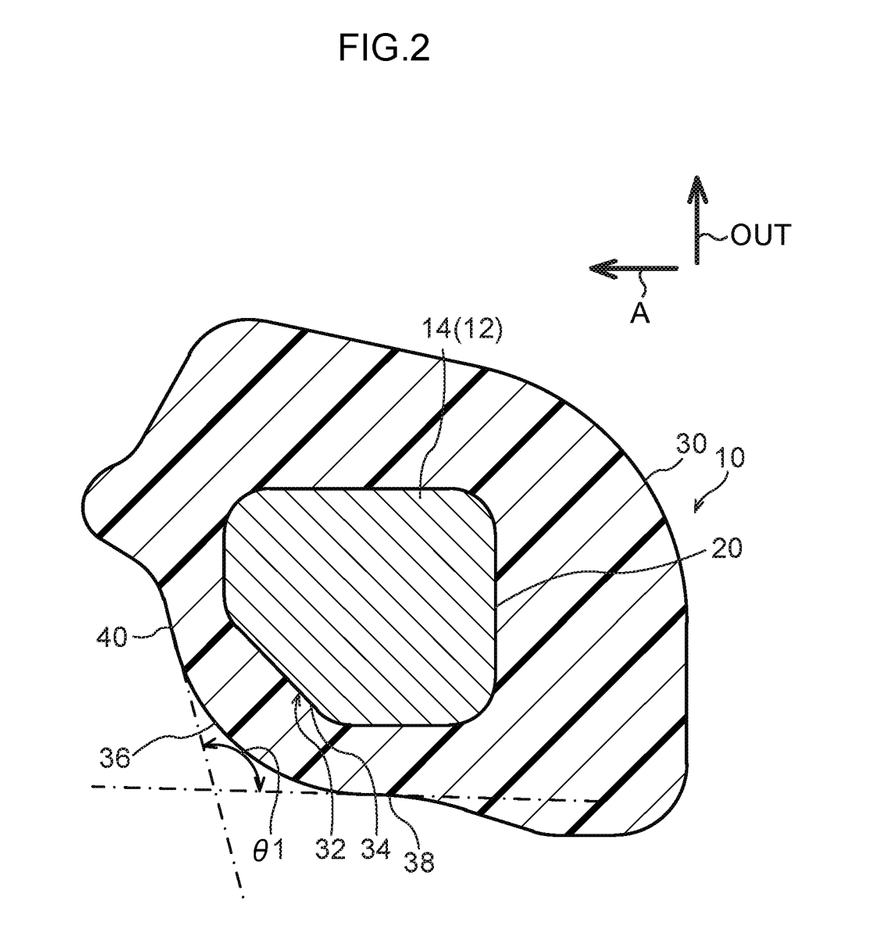
FIG. 2 is a cross-section taken along line 2-2 in FIG. 1.

Moreover, as illustrated in FIG. 2, a vehicle width direction inside face of the thinned portion 32 configures an inclined face 34. The inclined face 34 is displaced toward the vehicle width direction inside on progression toward the vehicle front side (vehicle front-rear direction outside) and on progression toward the vehicle lower side. Accordingly, the thickness of the metal core 12 at the thinned portion 32 becomes thinner on progression toward the vehicle front side (vehicle front-rear direction outside) and on progression toward the vehicle lower side.

The mold portion 30 is formed with a curved face 36 at the vehicle width direction inside and the vehicle front lower side (the arrow A direction side in FIG. 2) of the thinned portion 32 of the metal core 12. The curved face 36 protrudes out toward the vehicle width direction inside and the vehicle front lower side (vehicle front-rear direction outside (front side) and vehicle lower side). A vehicle width direction inside face 38 of the mold portion 30 is formed continuously at the vehicle width direction inside of the curved face 36, and a vehicle front lower side face 40 of the mold portion 30 is formed continuously at a vehicle front lower side (vehicle front-rear direction outside (front side) and vehicle lower side) of the curved face 36. An angle θ1 formed between the vehicle width direction inside face 38 and the vehicle front lower side face 40 in the mold portion 30 is set larger than 90 degrees.

As illustrated in FIG. 1, the thinned portion 42 of the metal core lower portion 14 of the metal core 12 is formed by pressing a vehicle rear side end portion and a vehicle lower side end portion of the metal core lower portion 14, including a vehicle rear lower side outer peripheral corner portion, which is at a vehicle rear lower side, of the metal core lower portion 14 of the metal core 12. The forming position of the thinned portion 42 on the metal core 12 is to the vehicle rear lower side (vehicle front-rear direction outside (rear side) and vehicle lower side) of a vehicle rear lower side end portion of the through hole 20 (vehicle front-rear direction (rear side) end portion and vehicle lower side end portion of the through hole 20) of the metal core 12.

In other words, the forming position of the thinned portion 42 on the metal core 12 is a position which is at at least another side in the vehicle front-rear direction (rear side) and at least one side in the vehicle upper-lower direction (lower side) of the metal core 12, on an outer peripheral portion of the metal core 12 (in the exemplary embodiment, the forming position of the thinned portion 42 includes the corner portion of the outer peripheral portion of the metal core 12).

Figure 3:
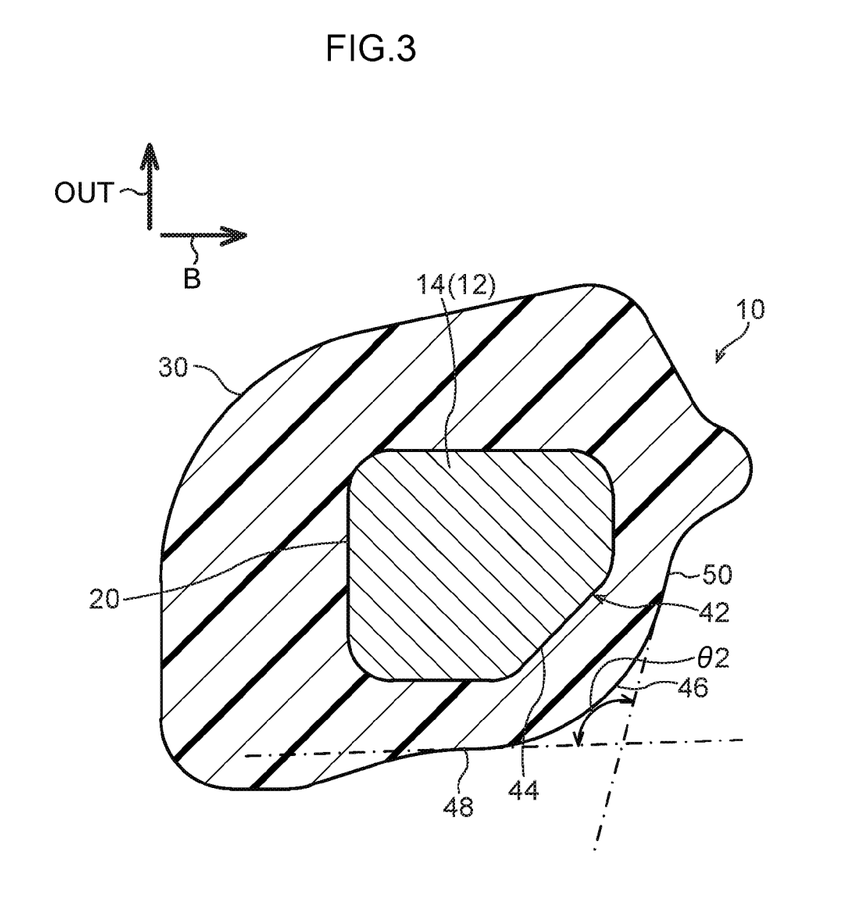
FIG. 3 is a cross-section taken along line 3-3 in FIG. 1.

Moreover, as illustrated in FIG. 3, a vehicle width direction inside face of the thinned portion 42 configures an inclined face 44. The inclined face 44 is displaced toward the vehicle width direction inside on progression toward the vehicle rear side (vehicle front-rear direction outside) and on progression toward the vehicle lower side. Accordingly, the thickness of the metal core 12 at the thinned portion 42 becomes thinner on progression toward the vehicle rear side (vehicle front-rear direction outside) and on progression toward the vehicle lower side.

The mold portion 30 is formed with a curved face 46 at a vehicle width direction inside and a vehicle rear lower side (the arrow B direction side in FIG. 3) of the thinned portion 42 of the metal core 12. The curved face 46 protrudes out toward the vehicle width direction inside and the vehicle rear lower side (vehicle front-rear direction outside (rear side) and vehicle lower side). A vehicle width direction inside face 48 of the mold portion 30 is formed continuously at the vehicle width direction inside of the curved face 46, and a vehicle rear lower side face 50 of the mold portion 30 is formed continuously at a vehicle rear lower side (vehicle front-rear direction outside and vehicle lower side) of the curved face 46. An angle θ2 formed between the vehicle width direction inside face 48 and the vehicle rear lower side face 50 in the mold portion 30 is set larger than 90 degrees.

Operation and Advantageous Effects of the First Exemplary Embodiment

In the through anchor 10 according to the present exemplary embodiment, the thinned portion 32 is formed at the vehicle front side end portion and the vehicle lower side end portion of the metal core lower portion 14, including the outer peripheral corner portion at the vehicle front lower side of the metal core lower portion 14 of the metal core 12. The thinned portion 42 is formed at the vehicle rear side end portion and the vehicle lower side end portion of the metal core lower portion 14, including the outer peripheral corner portion of the metal core lower portion 14. Accordingly, an increase in thickness and increase in size toward the vehicle front-rear direction sides can be prevented or suppressed at vehicle front-rear direction end portions of a vehicle lower side end portion of the through anchor 10, even if the mold portion 30 formed at the thinned portions 32 and 42 of the metal core 12 is thickened. This thereby enables the mechanical strength of the mold portion 30 to be secured at the vehicle front-rear direction end portions of the vehicle lower side end portion of the through anchor 10, and enables cracking and the like to be prevented or suppressed from occurring in the mold portion 30.

The thinned portion 32 of the metal core 12 is formed at the vehicle front lower side (vehicle front-rear direction outside and vehicle lower side) of the vehicle front lower side end portion of the through hole 20 of the metal core 12. The thinned portion 42 is formed at the vehicle rear lower side (vehicle front-rear direction outside and vehicle lower side) of the vehicle rear lower side end portion of the through hole 20. Accordingly, an increase in thickness, and an increase in size toward the vehicle front-rear direction sides, of the through anchor 10 in the vicinity of the vehicle rear side end portion and vehicle front side end portion of the through hole 20 can be prevented or suppressed, even if the mold portion 30 is thickened. This thereby enables the larger thickness of the mold portion 30 at the vehicle front lower side of the through hole 20 and at the vehicle rear lower side of the through hole 20 to be secured (obtained) without increasing the size of a vehicle front-rear direction dimension of the through anchor 10, even if the through hole 20 has a large dimension in the vehicle front-rear direction dimension.

The curved face 36 of the mold portion 30 formed at the thinned portion 32 of the metal core 12 protrudes out toward the vehicle front lower side and the vehicle width direction inside. The angle θ1 formed between the vehicle width direction inside face 38 and the vehicle front lower side face 40 of the mold portion 30, these being formed continuously to the curved face 36, is set larger than 90°. The curved face 46 of the mold portion 30 formed at the thinned portion 42 of the metal core 12 protrudes out toward the vehicle rear lower side and the vehicle width direction inside. The angle θ2 formed between the vehicle width direction inside face 48 and the vehicle rear lower side face 50 of the mold portion 30, these being formed continuously to the curved face 46, is set larger than 90°. A concentration of stress in the mold portion 30 can accordingly be prevented or suppressed in the vicinity of the thinned portions 32 and 42 of the metal core 12. This thereby enables cracking and the like to be prevented or suppressed from occurring in the mold portion 30 at the vehicle front-rear direction end portions of the vehicle lower side end portion of the through anchor 10.

In the present exemplary embodiment, the thinned portions 32 and 42 are formed at the metal core lower portion 14 by forming the metal core lower portion 14 of the metal core 12 with the inclined faces 34 and 44. Accordingly, a step is not formed in the metal core lower portion 14 in the thickness direction, even if the metal core lower portion 14 of the metal core 12 is locally thinned. This accordingly discourages stress from concentrating at boundaries between the thinned portions 32 and 42 and locations other than the thinned portions 32 and 42 in the metal core lower portion 14.

Second Exemplary Embodiment

Figure 4:
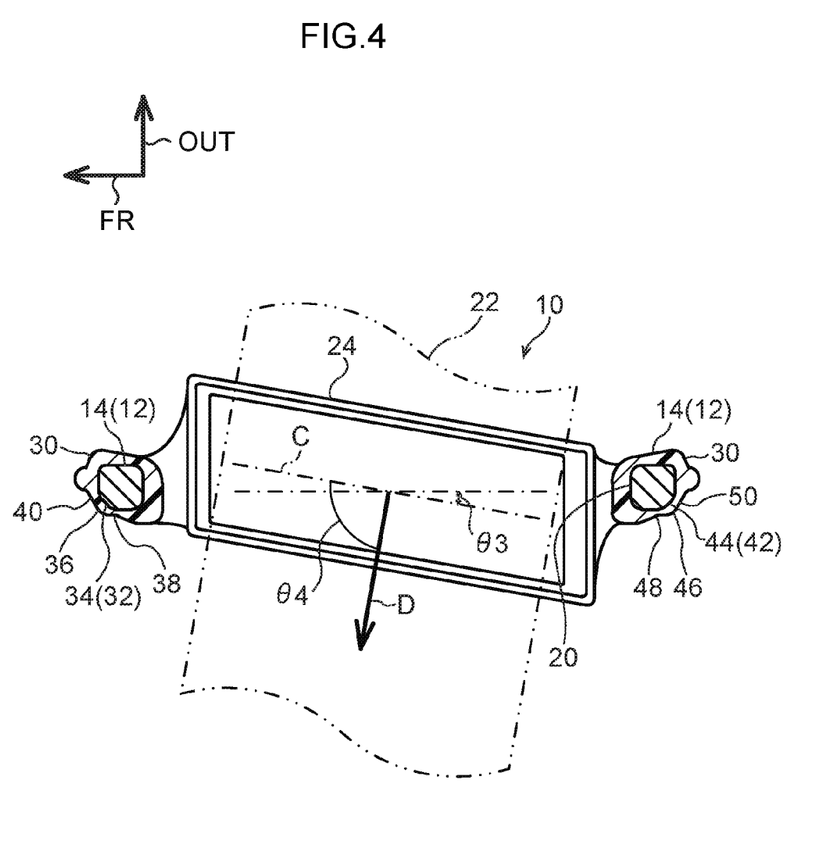
FIG. 4 is a cross-section illustrating main portions of an anchor for a seatbelt device according to a second exemplary embodiment, corresponding to a cross-section taken along line 4-4 in FIG. 1.

As illustrated in FIG. 4, in a through anchor 10 serving as an anchor for a seatbelt device according to a second exemplary embodiment, a direction of an axial line C of the center of curvature of the vehicle upper side face of the piece 24 is inclined at an angle θ3 about the vehicle up-down direction with respect to the longitudinal direction of the metal core lower portion 14 of the metal core 12 (namely, the vehicle front-rear direction). A vehicle width direction outside portion of the vehicle upper side face of the piece 24 accordingly is directed toward the vehicle width direction outside and the vehicle rear side, and a vehicle width direction inside portion of the vehicle upper side face of the piece 24 is directed toward the vehicle width direction inside and the vehicle front side.

When the webbing 22 is mounted over the body of the occupant, the occupant pulls the webbing 22 toward the vehicle front side and the vehicle width direction inside (the arrow D direction in FIG. 4). In the present exemplary embodiment, the vehicle width direction inside portion of the vehicle upper side face of the piece 24 is directed (faces) toward the vehicle width direction inside and the vehicle front side, and the vehicle width direction outside portion of the vehicle upper side face of the piece 24 is directed (faces) toward the vehicle width direction outside and the vehicle rear side. The webbing 22 inside the through hole 20 is thereby prevented or suppressed from moving toward the vehicle front side when the webbing 22 is pulled toward the vehicle front side and the vehicle width direction inside. The webbing 22 can accordingly be prevented or suppressed from deviating toward the vehicle front side portion of the through hole 20, and the webbing 22 can be prevented or suppressed from deforming in the width direction thereof. This thereby enables the pulling force required to pull out the webbing 22 to be lessened, and permits the webbing 22 to be pulled out smoothly when a force limiter of the seatbelt device is actuated in a vehicle emergency.

In the present exemplary embodiment, the longitudinal direction of the metal core lower portion 14 of the metal core 12 is configured to be along in the vehicle front-rear direction. This thereby enables a common metal core 12 to be employed with both a left side vehicle seat and a right side vehicle seat. This facilitates management of the metal core 12, and lowers costs.

An angle of inclination θ4 of the direction of the axial line C configured by the center of curvature of the vehicle upper side face of the piece 24 with respect to a pulling direction of the webbing 22 (the arrow D direction in FIG. 4) is preferably set to 90 degrees. However, there are no particular limitations to the angle of inclination θ3 of the axial line C of the center of curvature of the vehicle upper side face of the piece 24 with respect to the longitudinal direction of the metal core lower portion 14 of the metal core 12, and/or to the angle of inclination θ4 of the direction of the axial line C of the center of curvature of the vehicle upper side face of the piece 24 with respect to the pulling direction of the webbing 22, as long as a vehicle width direction inside portion of the vehicle upper side face of the piece 24 is directed toward the vehicle width direction inside and the vehicle front side, and a vehicle width direction outside portion of the vehicle upper side face of the piece 24 is directed toward the vehicle width direction outside and the vehicle rear side.

In each of the exemplary embodiments described above, the thinned portions 32 and 42 are formed at portions including corner portions on both vehicle front-rear direction sides of the vehicle lower side end portion of the metal core lower portion 14 of the metal core 12. However, for example, thinned portions may be configured at portions including corner portions on both vehicle front-rear direction sides of a vehicle upper side (another side in the vehicle upper-lower direction) end portion of the metal core lower portion 14 of the metal core 12, or thinned portions may be configured at portions including vehicle front-rear direction end portions of a vehicle lower side end portion of the metal core upper portion 16 of the metal core 12. The location for forming the thinned portions to the metal core 12 is therefore not limited.

In each of the exemplary embodiments described above, the thinned portions 32 and 42 are formed at the metal core lower portion 14 by forming the inclined faces 34 and 44 to the metal core lower portion 14 of the metal core 12. However, for example, thinned portions may be formed by locally forming steps in the thickness direction of the metal core 12. Namely, the specific configurations of the thinned portions of the metal core 12 are not limited, as long as the thinned portions are thinner (dimensions of the thinned portions in a penetrating direction of the through hole 20 are smaller) than other locations of the metal core 12.

In each of the exemplary embodiments described above, the present invention is applied to the through anchor 10. However, for example, the present invention may be applied to a seatbelt device tongue, through which webbing is inserted so as to be capable of moving in the webbing longitudinal direction, and that can be retained by a seatbelt device buckle.

What is claimed is:

1. An anchor for a seatbelt device comprising:
   a metal core having a lower core portion at which a through hole is formed,
   a webbing for restraining an occupant being inserted through and supported at the through hole; and
   a mold portion that is formed from a synthetic resin material and that covers the metal core,
   wherein portions of the lower core portion of the metal core at opposing outer sides of the through hole in a vehicle front-rear direction, are thinner than a central portion of the lower core portion at an outer side of the through hole that joins the portions at opposing outer sides, the thinner portions being thinner on outer edges of the portions at opposing outer sides in a thickness direction of the metal core than outer edges of the central portion, and
   wherein each thinner portion is formed by progressively reducing the thickness of the outer edges of the portions at opposing outer sides as the end of the outer edges are approached.

2. The anchor for a seatbelt device of claim 1, wherein, as seen from a penetrating direction of the through hole, each portion at opposing outer sides which portion is at a corner in an outer peripheral portion of the metal core, is thinner than the central portion of the metal core.

3. An anchor for a seatbelt device comprising:
   a metal core having a lower core portion at which a through hole is formed,
   a webbing for restraining an occupant being inserted through and supported at the through hole; and
   a mold portion that is formed from a synthetic resin material and that covers the metal core,
   wherein opposing outer portions of the lower core portion are thinner than another portion of the lower core portion,
   wherein, as seen from a penetrating direction of the through hole, each opposing outer portion of the lower core portion, which portion is at a corner in an outer peripheral portion of the lower core portion in a vehicle front-rear direction, is thinner than outer edges of a central portion of the metal core, and
   wherein each thinner opposing outer portion is formed by progressively reducing the thickness of outer edges of the opposing outer portions as the end of the outer edges are approached.

4. The anchor for the seatbelt device of claim 3,
   wherein each opposing outer portion of the lower core portion is an end portion of the metal core in the outer peripheral portion of the metal core, which end portion is at at least one side of the metal core in the vehicle front-rear direction, and further which end portion is at at least one side of the metal core in a vehicle up-down direction.

5. An anchor for a seatbelt device comprising:
a metal core having a lower core portion at which a through hole is formed,
a webbing for restraining an occupant being inserted through and supported at the through hole; and
a mold portion that is formed from a synthetic resin material and that covers the metal core,
wherein, as seen from a penetrating direction of the through hole,
an end portion of the lower core portion in an outer peripheral portion of the metal core, which end portion is at at least one side of the lower core portion in a vehicle front-rear direction, and further which end portion is at at least one side of the lower core portion in a vehicle up-down direction, is thinner than outer edges of a central portion of the lower core portion, and
wherein the thinner portion at at least one side of the lower core portion is formed by progressively reducing the thickness of outer edges of opposing outer portions as an end of the outer edges is approached.

* * * * *